April 28, 1931.　　J. H. SCOTT　　1,802,579
FRUIT AND VEGETABLE STAND
Filed March 18, 1930　　2 Sheets-Sheet 1

INVENTOR
J. H. SCOTT.
BY
ATTYS.

April 28, 1931. J. H. SCOTT 1,802,579
FRUIT AND VEGETABLE STAND
Filed March 18, 1930  2 Sheets-Sheet 2

INVENTOR
J. H. SCOTT.
BY
ATTYS.

Patented Apr. 28, 1931

1,802,579

UNITED STATES PATENT OFFICE

JOHN HILLIARD SCOTT, OF TORONTO, ONTARIO, CANADA

FRUIT AND VEGETABLE STAND

Application filed March 18, 1930. Serial No. 436,797.

My invention relates to improvements in fruit and vegetable stands, and the object of the invention is to devise a simple form of stand whereby various kinds of fruits and vegetables may be held for use in such a way that the dirt and moisture therefrom will be taken care of so that it will not be scattered in the compartment in which the stand is located, and it consists essentially of the arrangement and construction of parts all as hereinafter more particularly explained.

In the drawings like characters of reference indicate corresponding parts in each figure.

Figure 1:
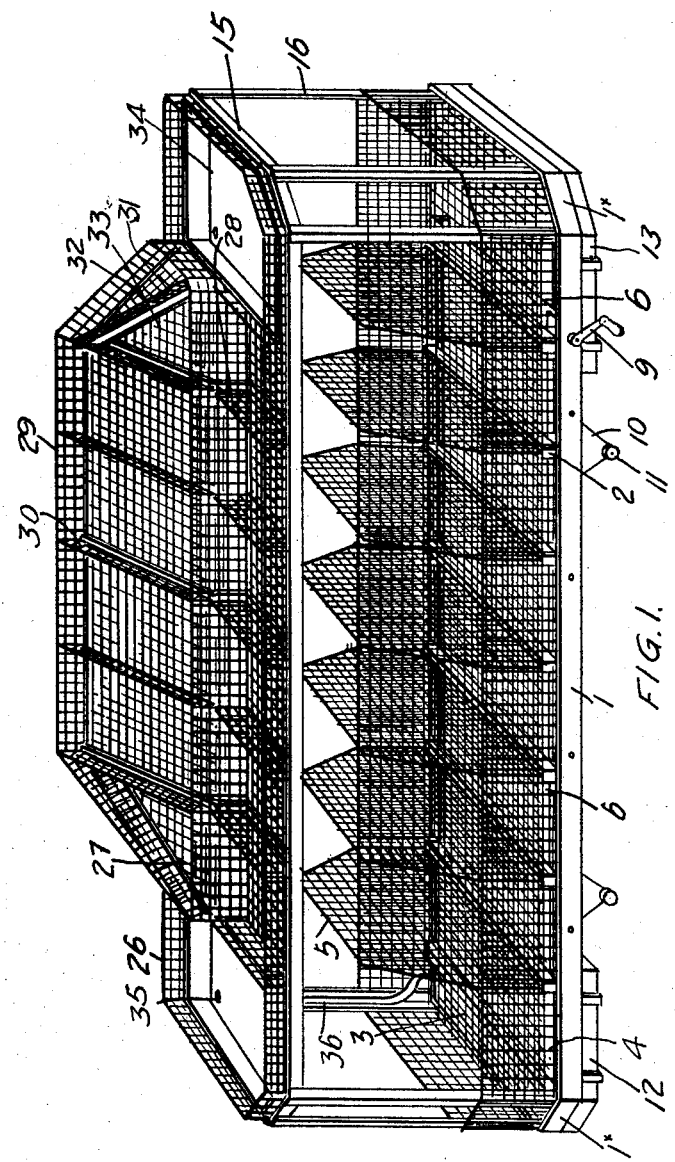
Fig. 1 is a perspective view of my stand.
Figure 2:
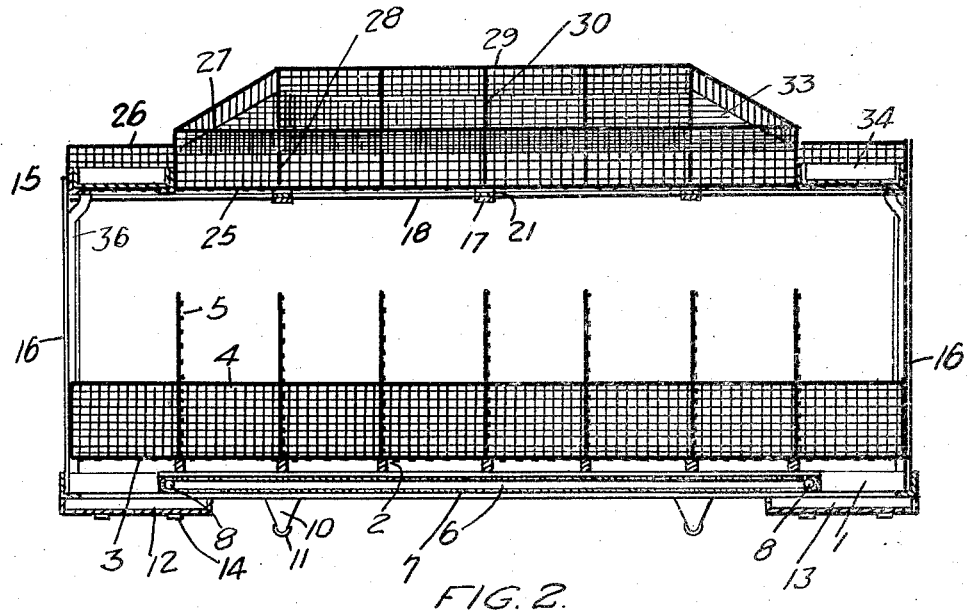
Fig. 2 is a longitudinal sectional view through Fig. 1.
Figure 3:
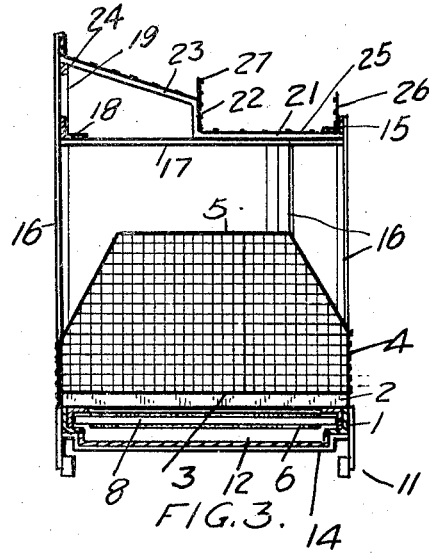
Fig. 3 is a transverse sectional view.

The base structure of the stand comprises a frame 1 formed of angle bars substantially oblong in form with the front corners chamfered off as indicated at 1ˣ, spaced apart cross bars 2 extending transversely of the frame at suitable distances apart, a series of bins formed by a perforated or mesh bottom 3, extending over the frame 1 and supported by the cross bars 2, a surrounding wall 4 also made of perforated or mesh material and transverse partitions 5 also are preferably made of perforated or of mesh material.

Within the frame 1 beneath the cross bars 2 is carried a conveyor 6 extending to a point adjacent one end of the frame 1 to a point adjacent the opposite end, or in other words, to a point just outside the end transverse partitions 5.

The conveyor 6 is of endless type comprising a band 7 mounted upon rollers 8 each of which is operated by a crank 9. The frame 1 is also carried on supporting brackets 10 provided with rollers 11 by which the device may be moved from place to place. Between the ends of the conveyor and the ends of the frame 1 an opening is formed through which the dirt gathered on the conveyor is discharged.

12 and 13 are dirt receiving pans withdrawably supported upon loop bars 14. All vegetables with roots which shed dirt are placed in the bins formed between the partitions 5, the dirt falling through the perforated bottom of the bins on to the conveyor band 7. From time to time the conveyor band 7 may be operated by either one of the cranks 9 so as to discharge dirt into the pans 12 or 13 which are emptied when filled.

A superstructure formed by a frame 15 similar to the frame 1 is carried upon standard bars 16 secured to the bottom to the frame 1 and at the top to the frame 15. These standard bars may be detachably connected to these frames so that if desired the structure may be broken down and shipped in a comparatively small space.

17 are transverse bars carried by the standard bars 16 and a longitudinally extending rear bar 18 provided with upward extensions 19. Transverse bars are provided, the front portions 21 of which are supported upon each transverse bar 17, the intermediate portion extending vertically as indicated at 22 and the rear portion in an incline direction as indicated at 23 its extremity being supported on a longitudinal bar 24.

The horizontal portions 21 support a perforated or mesh bottom 25. 26 is a perforated wall extending around the frame 15. 27 is a perforated wall secured to the vertical portions 22 of the bars 20 and 28 are transverse walls extending between the walls 26 and 27 to form the space into compartments for containing various kinds of fruits. The incline bar portions 23 also support a perforated or mesh bottom which is surrounded by a perforated wall 29 divided by a transverse wall 30 into compartments for containing other fruits, the compartments 32 and 33 may also be formed at the ends of the compartments formed by the transverse walls 31.

In the end space between the end transverse walls 28 is supported a pan 34 provided with a drain hole 35 from which extends a drain pipe 36 to any suitable connection to the floor of the compartment in which the stand is located.

From this description it will be seen that I have devised a very simple device which will hold a very great many different fruits and vegetables, which will take care of all the dirt falling therefrom particularly root vegetables and the moisture which is shed from lettuce and like vegetables.

What I claim as my invention is:

1. A fruit and vegetable stand comprising a base structure consisting of an oblong frame, transverse bars carried by the frame in suitably spaced apart positions, a surrounding wall carried by the frame, a perforated or mesh bottom wall carried by the cross bars and transverse partitions extending between the front and rear portions of the surrounding wall, supporting means for the frame, means for receiving the dirt passing through the perforated bottom from the vegetable supported thereon, means for conveying the dirt to either end of the frame to a discharging point, and a withdrawable dirt receiving container carried at each end of the frame.

2. A fruit and vegetable stand comprising a base consisting of an oblong frame carried on suitable supports, transverse bars carried by the frame, a perforated bottom wall carried by the cross bars, a surrounding wall carried by the frame, transverse partitions extending between the front and rear portions of the surrounding walls, an endless conveyor carried in the base frame beneath the transverse bars, and operating cranks for operating the conveyor.

3. A fruit and vegetable stand comprising a base consisting of an oblong frame carried on suitable supports, transverse bars carried by the frame, a perforated bottom wall carried by the cross bars, a surrounding wall carried by the frame, transverse partitions extending between the front and rear portions of the surounding walls, an endless conveyor carried in the base frame beneath the transverse bars and extending into proximity to each end of the base frame to form a discharge opening, a dirt receiving pan withdrawably carried by the base frame beneath such discharge openings, and cranks for operating the conveyor.

4. A fruit and vegetable stand comprising a base structure consisting of an oblong frame, transverse bars carried by the frame in suitably spaced apart positions, a surrounding wall carried by the frame, a perforated or mesh bottom wall carried by the cross bars and transverse partitions extending between the front and rear portions of the surrounding wall, supporting means for the frame, means for receiving the dirt passing through the perforated bottom from the vegetable supported thereon, means for conveying the dirt to either end of the frame to a discharging point, a superstructure comprising an oblong frame, supporting standards for carrying the superstructure above the base frame, a surrounding wall carried by the superstructure frame, suitably divided fruit receiving compartments carried by the central portion of the superstructure, a pan carried at each end of the fruit receiving compartments within the surrounding wall of the superstructure, and provided with drain outlets for moisture gathering therein.

JOHN HILLIARD SCOTT.